United States Patent
Harreau (10) Patent No.: US 9,732,840 B2
(45) Date of Patent: Aug. 15, 2017

(54) DUAL CIRCUIT LUBRICATION METHOD AND DEVICE WITH INCREASED RELIABILITY FOR A MAIN POWER TRANSMISSION GEARBOX OF AN AIRCRAFT

(71) Applicant: AIRBUS HELICOPTERS, Marignane (FR)

(72) Inventor: Jean-Guy Harreau, Vitrolles (FR)

(73) Assignee: AIRBUS HELICOPTERS, Marignane (FR)

( * ) Notice: Subject to any disclaimer, the term of this patent is extended or adjusted under 35 U.S.C. 154(b) by 99 days.

(21) Appl. No.: 14/924,790

(22) Filed: Oct. 28, 2015

(65) Prior Publication Data

US 2016/0123457 A1 May 5, 2016

(30) Foreign Application Priority Data

Oct. 31, 2014 (FR) ...................... 14 02464

(51) Int. Cl.
| | | |
|---|---|---|
| *F16H 57/04* | (2010.01) | |
| *B64C 27/14* | (2006.01) | |
| *F16N 29/00* | (2006.01) | |

(52) U.S. Cl.
CPC ......... *F16H 57/0435* (2013.01); *B64C 27/14* (2013.01); *F16H 57/0436* (2013.01);
(Continued)

(58) Field of Classification Search
CPC ............. F16H 57/0435; F16H 57/0436; F16H 57/0441; B64C 27/14; F16N 29/00; F16N 2260/04; F16N 2260/20
See application file for complete search history.

(56) References Cited

U.S. PATENT DOCUMENTS 4,976,335 A 12/1990 Cappellato
5,121,815 A 6/1992 Francois et al.
(Continued)

FOREIGN PATENT DOCUMENTS

EP 0443901 8/1991
EP 2505878 10/2012
(Continued)

OTHER PUBLICATIONS

French Search Report for French Application No. FR 1402464, Completed by the French Patent Office on Jun. 19, 2015, 5 Pages.

*Primary Examiner* — William E Dondero
*Assistant Examiner* — Robert T Reese
(74) *Attorney, Agent, or Firm* — Brooks Kushman P.C.

(57) ABSTRACT

A dual circuit lubrication device for lubricating a mechanical system, the lubrication device being provided with two independent lubrication circuits and a tank that is common to both lubrication circuits and that contains a lubrication liquid. A first lubrication circuit has two first suction points for sucking in the lubrication liquid and situated inside the tank, and a second lubrication circuit includes a second suction point for sucking in the lubrication liquid and situated inside the tank. The dual circuit lubrication device has means for detecting the lubrication liquid passing below a limit depth in the tank, which means are formed by a high first suction point situated at the level of the limit depth, the second suction point being situated below the limit depth, and a low first suction point being below the second suction point.

20 Claims, 2 Drawing Sheets

(52) U.S. Cl.
CPC ......... *F16H 57/0441* (2013.01); *F16N 29/00* (2013.01); *F16N 2260/20* (2013.01)

(56) References Cited

U.S. PATENT DOCUMENTS

| | | | |
|---|---|---|---|
| 6,817,448 B2 * | 11/2004 | Maret | ................... B64C 27/14 184/6.26 |
| 7,500,542 B2 | 3/2009 | Maret et al. | |
| 8,230,835 B2 | 7/2012 | Gibson et al. | |
| 8,459,413 B2 | 6/2013 | Gmirya et al. | |
| 2010/0229823 A1 | 9/2010 | Gibson et al. | |
| 2013/0306022 A1 | 11/2013 | Resh et al. | |
| 2016/0123456 A1 * | 5/2016 | Goujet | ................... B64C 27/12 184/6.4 |
| 2016/0369887 A1 * | 12/2016 | Sheridan | ............. F16H 57/0482 |

FOREIGN PATENT DOCUMENTS

| | | |
|---|---|---|
| FR | 2658577 | 8/1991 |
| FR | 2826094 | 12/2002 |

* cited by examiner

DUAL CIRCUIT LUBRICATION METHOD AND DEVICE WITH INCREASED RELIABILITY FOR A MAIN POWER TRANSMISSION GEARBOX OF AN AIRCRAFT

CROSS REFERENCE TO RELATED APPLICATION

This application claims priority to French patent application No. FR 14 02464 filed on Oct. 31, 2014, the disclosure of which is incorporated in its entirety by reference herein.

BACKGROUND OF THE INVENTION (1) Field of the Invention

The present invention relates to the field of lubricating gearboxes, in particular power transmission gearboxes for a rotary wing aircraft.

The present invention relates to a dual circuit lubrication method and device with increased reliability for a mechanical system. The lubrication method and device are particularly suitable for lubricating a main power transmission gearbox of a rotary wing aircraft.

(2) Description of Related Art

A mechanical system generally has rotary elements, such as shafts and bearings, and also elements for transmitting power and for reducing or increasing speed, such as gearing. For proper operation of the mechanical system it is therefore essential for these elements to be lubricated and cooled, e.g. by means of oil under pressure. This lubrication is generally provided by a lubrication circuit and has as its main functions limiting the wear and the heating of the elements of the mechanical system, and consequently prolonging the lifetime of the mechanical system. Without such lubrication, the operation of the mechanical system may be degraded rapidly, or may become impossible.

As a result of the mechanical system being lubricated, the oil flowing through the lubrication circuit can sometimes become very hot, in which case it is cooled in a cooling circuit, which is generally located outside the mechanical system, prior to being usable once again for lubricating the mechanical system. The cooling circuit includes a heat exchanger, e.g. an oil/air heat exchanger.

The cooling circuit outside the mechanical system constitutes a vulnerable portion of a lubrication circuit for the mechanical system when it comes to leaks. The cooling circuit has pipes, numerous connections, and the heat exchanger. The cooling circuit is subjected to thermal stresses, such as a large difference between the temperature of the oil and the outside temperature, and it is subjected to vibratory stresses generated by the mechanical system and/or by a vehicle using the mechanical system. In addition, the cooling circuit is exposed outside the mechanical system. In particular when the mechanical system is fitted to an aircraft, the cooling circuit is situated outside the mechanical system of the aircraft, e.g. under a cover. Nevertheless, it can still be exposed to impacts against birds or ice, for example. As a result, one or more leaks may appear in its connections and its pipes and indeed in the heat exchanger, such leaks being caused essentially by the vibratory and thermal stresses.

When such leaks are present, the mechanical system can generally nevertheless continue to be lubricated, but only for a limited duration. It can happen that all of the oil stored in the lubrication circuit, e.g. in a tank, is lost to outside the lubrication circuit via such leaks. Such leaks may possibly be detected as a result of a drop in the pressure of the oil in the lubrication circuit.

Furthermore, a lubrication circuit also includes a pressure generator such as a pump in order to feed the lubrication circuit with oil and thus enable oil to flow in the lubrication circuit. In the event of a failure of the pressure generator, the flow of oil is interrupted, and consequently the lubrication of the mechanical system is likewise interrupted, with this occurring immediately.

In the event of this lubrication being lost, degradations can rapidly appear in the operation of the mechanical system. The consequence of such degradations occurring in a mechanical system fitted to a self-propelled vehicle may be that the vehicle ceases to be propelled immediately, or once the oil in the lubrication circuit has been used up.

In contrast, if the mechanical system constitutes the main power transmission gearbox of a rotary wing aircraft, such degradations of the circuit for lubricating the main power transmission gearbox can have consequences that are catastrophic, such as the aircraft performing an emergency landing or indeed crashing.

In order to mitigate such consequences, a mechanical system may include an emergency lubrication circuit. Such an emergency lubrication circuit makes it possible, in the event of the main lubrication circuit being out of operation, to provide lubrication at least for essential members of the mechanical system so as to ensure that the mechanical system continues to operate. For safety reasons, it is preferable for the aircraft to operate at a reduced level of power in order to limit the stresses on the mechanical system. Such an emergency lubrication circuit thus makes it possible, when the mechanical system is a main power transmission gearbox of an aircraft, for example, to enable the mechanical system to operate and consequently to enable the aircraft to operate in order to be able to reach a landing site. Such an emergency lubrication circuit thus improves the safety of the aircraft.

An emergency lubrication circuit may be arranged in parallel with a main lubrication circuit, as described in Document U.S. Pat. No. 8,230,835. Each lubrication circuit has its own pump, but they both use the same oil tank. Nevertheless, although the emergency circuit enables the mechanical system to be lubricated sufficiently in the event of a failure of the main circuit, it is in fact used only rarely. As a result, the emergency circuit constitutes an on-board mass that operates rarely.

In addition, the zones where leaks might appear in the main lubrication circuit are frequently situated in the heat exchanger and its connections. In order to avoid such leaks also appearing in the emergency lubrication circuit, the emergency circuit does not have a heat exchanger. As a result, the oil flowing through the emergency circuit is not cooled. Consequently, the emergency lubrication circuit can be used for a limited duration only in order to avoid the oil reaching a temperature that is too high.

The emergency circuit is generally put into operation automatically as a result of a loss of pressure being detected in the main circuit as a result of a failure of the pump of the main circuit or indeed as a result of a leak from the main circuit. The emergency lubrication circuit may also be put into operation manually by an operator.

In order to reduce the risk of a failure of the main lubrication circuit being caused by the emergency circuit, the emergency circuit is generally fitted with a bypass system serving to prevent flow in the pipes of the emergency circuit when oil pressure in the main lubrication circuit is sufficient. Thus, in the event of a leak from the emergency lubrication circuit, that circuit is no longer operational, but it does not prevent the main lubrication circuit from operating.

The drawback of the bypass system is that it makes it possible for there to be a dormant failure in the emergency circuit, with this failure being detected only at the moment when the emergency circuit is put into operation. Under such circumstances, there is a major anomaly that can be critical for a rotary wing aircraft.

In certain applications of rotary wing aircraft, the main power transmission gearbox does not include an emergency lubrication circuit proper, but rather it has two lubrication circuits that are identical and independent. Each lubrication circuit has its own pump and its own heat exchanger. Nevertheless, both lubrication circuits make common use of the same oil tank formed by the bottom of the main power transmission gearbox. As a result, if there is a leak in one of the lubrication circuits, the bottom of the main power transmission gearbox will be emptied of its oil over a shorter or longer period of time, thereby leading to a compete failure of the lubrication system.

Certain lubrication systems include an emergency tank, sometimes installed directly inside the mechanical system for lubricating, as described in Documents EP 2 505 878 and FR 2 658 577. The emergency tank is positioned above the members that it is essential to lubricate and it is fed continuously from the lubrication circuit. Oil then flows continuously under gravity from this emergency tank over the essential members. In the event of the lubrication circuit failing, the emergency tank is no longer fed with oil, but it enables the essential members to continue to be lubricated for a limited period corresponding to the time taken to empty the oil from the emergency tank.

Furthermore, Document U.S. Pat. No. 8,459,413 describes a different architecture that serves to limit the effects of a leak present in an oil tank. That architecture does not have an emergency circuit proper, but rather a pump that generates suction in the tank when a leak from the tank is detected. This suction then serves to limit the quantity of oil that is lost via the leak, thereby increasing the length of time the lubrication circuit can operate in spite of the presence of the leak. Nevertheless, the leak continues to be present and the length of time the lubrication circuit can operate is indeed increased, but it remains limited to until the oil has run out.

Also known is Document US 2013/0306022, which describes a lubrication system for an engine having two independent lubrication circuits. The flow rates and/or the pressures in the two circuits are different. The two circuits may lubricate different components of the engine or they may lubricate the same components so as to improve the effectiveness of the lubrication.

Furthermore, the technological background includes the following Documents: U.S. Pat. No. 4,976,335 and FR 2 826 094.

BRIEF SUMMARY OF THE INVENTION

An object of the present invention is thus to propose a method and a device for lubricating a mechanical system that make it possible to overcome the above-mentioned limitations, enabling the mechanical system to be lubricated in spite of the presence of a failure in a lubrication circuit, and in particular without putting a limit on the duration of the lubrication.

The invention provides a dual circuit lubrication method for lubricating a mechanical system. The mechanical system has a tank containing the lubrication liquid. The dual circuit lubrication method comprises the following steps:
using the lubrication liquid to lubricate the mechanical system simultaneously via a first lubrication circuit and a second lubrication circuit;
detecting a drop in the level of the lubrication liquid in the tank to below a limit depth;
stopping the flow of the lubrication liquid in the first lubrication circuit;
measuring the pressure of the lubrication liquid in the second lubrication circuit;
detecting a drop of the pressure of the lubrication liquid in the second lubrication circuit;
reestablishing the flow of the lubrication liquid in the first lubrication circuit; and
stopping the flow of the lubrication liquid in the second lubrication circuit.

By way of example, the mechanical system has rotary elements and elements for transmitting power and for reducing or increasing speed, which elements need to be lubricated and cooled by a lubrication liquid such as oil so as to enable the mechanical system to operate effectively and lastingly.

By way of example, the mechanical system is a main power transmission gearbox of a rotary wing aircraft. Under such circumstances, the tank is generally constituted by a casing of the main power transmission gearbox.

When a leak appears in one of the two lubrication circuits, some of the lubrication liquid is lost via the leak to outside the lubrication device. Consequently, the depth of lubrication liquid in the tank decreases. Consequently, by detecting that the depth of the lubrication liquid in the tank is below a limit depth, it is detected that a leak is present on at least one of the two lubrication circuits.

In a first implementation of the method of the invention, the drop of the level of the lubrication liquid to below the limit depth in the tank is detected by detecting a drop in the pressure of the lubrication liquid in the first lubrication circuit, e.g. by means of a first pressure sensor forming part of the first lubrication circuit. If a high first suction point of the first lubrication circuit is situated in the tank at the level of the limit depth, suction and consequently flow of the lubrication liquid in the first lubrication circuit becomes impossible as soon as the depth of the lubrication liquid in the tank goes below the limit depth. Consequently, the pressure of the lubrication liquid in the first lubrication circuit drops.

In a second implementation of the method of the invention, the drop in the level of the lubrication liquid to below the limit depth in the tank is detected directly by means of a liquid presence sensor situated in the tank at the level of the limit depth. A liquid presence sensor positioned in the tank at the level of the limit depth serves to detect that the depth of the lubrication liquid in the tank is either below the limit depth or else above or at the limit depth. In this second implementation, the first suction point of the first lubrication circuit is positioned in the tank below the limit depth. This first suction point is preferably situated at the bottom of the tank.

This detection of the drop in the level of the lubrication liquid to below the limit depth makes it possible to determine that a leak is present in one of the two lubrication circuits, but without determining which particular circuit has the leak. In order to do that, the method of the invention then makes it possible to determine which lubrication circuit is faulty by checking both lubrication circuits in succession.

After detecting the drop in the level of the lubrication liquid to below the limit depth, the flow of the lubrication liquid is stopped initially in the first lubrication circuit in order to test the operation of the second lubrication circuit.

In the first implementation of the method of the invention, the drop of the level of the lubrication liquid to below the high first suction point normally leads to a first pump becoming unprimed and consequently to the flow of the lubrication liquid in the first lubrication circuit being stopped. The function of the first pump is to draw lubrication liquid from the tank and to increase its pressure so that the lubrication liquid flows through the first lubrication circuit.

However, when the mechanical system forms part of a rotary wing aircraft, the attitude of the aircraft can vary in flight, in particular when turning. The high first suction point may then find itself temporarily below the level of the lubrication liquid in the tank in spite of the level of the lubrication liquid dropping to below the limit depth, thereby leading to the first pump being primed once more and consequently to the lubrication liquid flowing once again through the first lubrication circuit. The first pump will become unprimed once more and the flow of lubrication liquid through the first lubrication circuit will be stopped again when the aircraft returns to a substantially level attitude, i.e. a substantially horizontal attitude, with the high first suction point then once more being above the level of the lubrication liquid in the tank.

In order to avoid such untimely starts and stops of the flow of the lubrication liquid through the first lubrication circuit, it can be useful, or indeed essential, to stop this flow of the lubrication liquid through the first lubrication circuit completely. Such untimely restarting of the flow of the lubrication liquid through the first lubrication circuit is to be avoided since, if the detected leak is in this first lubrication circuit that can contribute to emptying out a portion of the lubrication liquid still to be found in the tank.

In contrast, in the second embodiment of the method of the invention, the first suction point of the first lubrication circuit is positioned below the limit depth, so there is no interruption of lubrication liquid feed to the first pump and the flow of the lubrication liquid through the first lubrication circuit is not stopped by the level of the lubrication liquid dropping to below the limit depth.

It is therefore necessary to stop the lubrication liquid flowing in the first lubrication circuit in order to avoid emptying out the lubrication liquid that is to be found in the tank.

The flow of the lubrication liquid through the first lubrication circuit can be stopped by stopping the first pump that is included in the first lubrication circuit. For example, the first pump may be an electric pump and the electrical power supply for the first pump can be switched off. The first pump could equally well be a mechanical pump driven by a gearbox, and it is then possible to disconnect the first pump from the gearbox, e.g. by using clutch means.

It is also possible to stop lubrication of the mechanical system by the first lubrication circuit without acting on the first pump but by using a first valve included in the first lubrication circuit. Thus, the first valve is put into a closed position interrupting any flow of the lubrication liquid in the first lubrication circuit. The first valve in the closed position may allow the lubrication liquid to flow between the tank and the first pump, but the lubrication liquid is then returned to the tank so it cannot reach the first lubrication circuit.

The closed position of the first valve advantageously makes it possible to avoid stopping the first pump until it is certain that the failure does indeed lie in the first lubrication circuit.

This first valve may be operated to occupy its closed position automatically as a result of detecting that the level of the lubrication liquid has dropped below the limit depth.

It is also possible for the first valve to be operated to occupy its closed position by an operator as a result of a visual and/or audible alarm being issued on detecting that the level of the lubrication liquid has dropped below the limit depth.

Thereafter, it is possible to test the pressure of the lubrication liquid in the second lubrication circuit, e.g. by means of a second pressure sensor included in the second lubrication circuit. The second pressure sensor measures the pressure of the lubrication liquid in the second lubrication circuit.

Nevertheless, a pressure sensor does not necessarily detect a drop in pressure resulting from a leak present in a lubrication circuit so long as the lubrication liquid is flowing through the lubrication circuit under pressure. If the leak is a slow leak, the drop in the pressure of the lubrication liquid generated by such a slow leak cannot be detected by the pressure sensors that are generally used in a lubrication circuit.

In contrast, if the leak is in the second lubrication circuit, with the lubrication liquid flowing under pressure in the second lubrication circuit, then some of the lubrication liquid continues to be lost from the leak. This causes the level of the lubrication liquid in the tank to continue dropping.

Consequently, when the level of the lubrication liquid in the tank drops to below a second suction point of the second lubrication circuit, the lubrication liquid can no longer flow through the second lubrication circuit. The pressure of the lubrication liquid in the second lubrication circuit drops as soon as the level of the lubrication liquid in the tank is below the second suction point of the second lubrication circuit.

This second suction point needs to be located in the tank at a position below the limit depth in order to enable the second lubrication circuit to be fed with lubrication liquid after it has been detected that the depth of the lubrication liquid in the tank is below the limit depth. However, the second suction point must not be at the bottom of the tank so as to avoid completely emptying the tank before detecting that the leak is located in the second lubrication circuit.

In contrast, if no leak is present in the second lubrication circuit, the level of the lubrication liquid in the tank does not change and the pressure of the lubrication liquid in the second lubrication circuit does not change either. It can then be deduced that the leak is present in the first lubrication circuit. It is therefore appropriate to keep the flow of the lubrication liquid active in the second lubrication circuit only, with the flow of the lubrication liquid in the first lubrication circuit being stopped. If the first pump has not been stopped already, in particular because a first valve is being used, it is then possible to stop the first pump.

After detecting a drop in the pressure of the lubrication liquid in the second lubrication circuit, the flow of the lubrication liquid in the first lubrication circuit is restarted and the flow of the lubrication liquid in the second lubrication circuit is stopped.

As with the first lubrication circuit, the drop in the level of the lubrication liquid to below the second suction point normally leads to the flow of the lubrication liquid in the second lubrication circuit stopping, with a second pump present in the second lubrication circuit being unprimed. The function of this second pump is to draw the lubrication liquid from the tank and to increase its pressure so that the lubrication liquid flows through the second lubrication circuit.

Nevertheless, in order to avoid untimely starting and stopping of the flow of the lubrication liquid through the second lubrication circuit in the event of the mechanical system forming part of a rotary wing aircraft, it may be useful or indeed essential to stop this flow of lubrication liquid through the second lubrication circuit completely.

It is then possible to stop the flow of the lubrication liquid through the second lubrication circuit by stopping the second pump of the second lubrication circuit. Like the first pump, the second pump may be an electric pump or it may be a mechanical pump driven by a gearbox. Depending on circumstances, it is then possible to switch off the electrical power supply to the second pump or to separate the second pump from the gearbox by using clutch means.

It is also possible to stop the lubrication liquid flowing in the second lubrication circuit without acting on the second pump, but instead by using a second valve included in the second lubrication circuit. This second valve is thus put into a closed position that interrupts any flow of the lubrication liquid through the second lubrication circuit. This second valve in the closed position may serve for example to allow the lubrication liquid to flow from the tank to the second pump, while causing the lubrication liquid subsequently to be returned to the tank without reaching the second lubrication circuit.

This second valve may be operated to occupy the closed position automatically as a result of detecting a drop in the pressure of the lubrication liquid in the second lubrication circuit.

The second valve may also be operated to occupy the closed position manually by an operator as a result of a visual and/or audible alarm being issued following the detection of the drop in the pressure of the lubrication liquid in the second lubrication circuit.

In parallel with stopping the flow of the lubrication liquid through the second lubrication circuit, the flow of the lubrication liquid is reestablished through the first lubrication circuit in order to lubricate the mechanical system by means of the first lubrication circuit.

If the first pump of the first lubrication circuit has previously been stopped, then the first pump is put back into operation.

In the second implementation of the method of the invention, putting the first pump back into operation is sufficient, since the first suction point of the first lubrication circuit is situated in the tank below the limit depth. Nevertheless, this first suction point must also be situated below the second suction point in order to enable the first lubrication circuit to be fed with lubrication liquid.

In contrast, in the first implementation of the method of the invention, putting the first pump back into operation is not sufficient. In the first implementation, a high first suction point of the first lubrication circuit is situated in the tank at the level of the limit depth. The first lubrication circuit must also have a low first suction point situated in the tank below the second suction point, and preferably at the bottom of the tank.

The first lubrication circuit may have two first suction points and a first valve in order to switch the first pump to the high first suction point or else to the low first suction point.

By default, this first valve enables the first pump to be in connection with the high first suction point. The first valve may be operated so that the first pump is put into communication with the low first suction point automatically as a result of detecting a drop of the pressure of the lubrication liquid in the second lubrication circuit.

This first valve may also be operated manually by an operator as a result of a visual and/or audible alarm being issued on detecting the drop of the pressure of the lubrication liquid in the second lubrication circuit.

Furthermore, the first valve may also include a closed position, as mentioned above, the closed position preventing any flow of the lubrication liquid through the first lubrication circuit.

Furthermore, in the first implementation of the invention, the first lubrication circuit may have a single suction point which is then movable. This first suction point can then move vertically inside the tank from a high position situated at the level of the limit depth to a low position, e.g. situated at the bottom of the tank. By default, the movable first suction point is in the high position, thereby constituting the high first suction point. Thereafter, in order to reestablish the flow of the lubrication liquid in the first lubrication circuit, this movable first suction point is moved to its low position, thereby constituting the low first suction point.

The movement of the first suction point from the high position to the low position may be controlled automatically on detecting the drop of the pressure of the lubrication liquid in the second lubrication circuit. This movement may also be controlled manually by an operator as a result of a visual and/or audible alarm being issued on detecting the drop of the pressure of the lubrication liquid in the second lubrication circuit.

Stopping the flow of the lubrication liquid in the second lubrication circuit and restarting the flow of the lubrication liquid in the first lubrication circuit may take place simultaneously or sequentially, with it being possible to stop the second lubrication circuit before or after restarting the first lubrication circuit.

Nevertheless, it is preferable to restart the first lubrication circuit before stopping the second lubrication circuit in order to minimize the length of time during which the mechanical system is not provided with any lubrication.

Furthermore, after restarting the flow of the lubrication liquid through the first lubrication circuit, the pressure of the lubrication liquid in the first lubrication circuit is measured. If this pressure of the lubrication liquid in the first lubrication circuit drops once more, that means that a leak is also present in the first lubrication circuit, or else that the leak is in fact a leak directly from the tank. The pressure of the lubrication liquid in the first lubrication circuit drops in particular as soon as the level of the lubrication liquid in the tank drops below the low first suction point of the first lubrication circuit. Under such circumstances, the mechanical system is no longer lubricated by either of the lubrication circuits.

Furthermore, after detecting the drop in the level of the lubrication liquid to below the limit depth in the tank, the mechanical system is lubricated by only one lubrication circuit. This means that the lubrication of the mechanical system is reduced. It is then appropriate to reduce the stress applied to the mechanical system in order to avoid degrading the mechanical system, and the level at which it is operated should match this reduced lubrication. For this purpose, an alarm, which may for example be visual and/or audible, is sent to an operator as soon as the drop in the level of the lubrication liquid in the tank to below the limit depth is detected.

Thus, when the mechanical system is a main power transmission gearbox of a rotary wing aircraft, the stress put on the main power transmission gearbox needs to be reduced as soon as the drop in the level of the lubrication liquid to below the limit depth in the tank is detected. By way of example, the forward speed of the aircraft may be reduced.

The present invention also provides a dual circuit lubrication device for a mechanical system. The lubrication device is provided with tank and two independent lubrication circuits. The tank contains a lubrication liquid such as oil and it is used jointly by both lubrication circuits in order to lubricate the mechanical system.

A first lubrication circuit comprises a first pump, first pipes, a first pressure sensor, a first filter, a first heat exchanger, first nozzles, and at least one first suction point for sucking up the lubrication liquid, each first suction point being situated in the tank. The first pump acts via the first suction point to deliver the lubrication liquid present in the tank to the first pipes and to the first nozzles in order to lubricate the mechanical system.

A second lubrication circuit comprises a second pump, second pipes, a second pressure sensor, a second filter, a second heat exchanger, second nozzles, and at least one second suction point for sucking up the lubrication liquid, the second suction point being situated in the tank. The second pump acts via the second suction point to deliver the lubrication liquid present in the tank to the second pipes and to the second nozzles in order to lubricate the mechanical system.

The two lubrication circuits thus act simultaneously to lubricate the mechanical system.

In addition, the first and second nozzles may be constituted by a single series of nozzles that are common to both lubrication circuits. Each lubrication circuit then has one or more non-return means, such as check valves, thus avoiding direct communication between the two lubrication circuits.

The dual circuit lubrication device is remarkable in that it includes detector means for detecting the level of the lubrication liquid in the tank dropping below the limit depth. Furthermore, the second suction point is situated below the limit depth. The dual circuit lubrication device can thus perform the above-described lubrication method.

In a first embodiment of the dual circuit lubrication device of the invention, the detector means are formed by a high first suction point and by the first pressure sensor, the high first suction point being situated at the level of the limit depth.

This first embodiment of the dual circuit lubrication device may be provided in several variants.

In a first variant of the first embodiment, the first lubrication circuit has two first suction points and a two-position first valve connecting the first pump with one or the other of these two first suction points. The high first suction point is situated at the level of the limit depth and a low first suction point is situated in a low position, below the limit depth and also below the second suction point. The low first suction point is preferably situated at the bottom of the tank.

This first variant enables the lubrication liquid to be caused to flow either, when in a first position, between the first pump and the high first suction point, or else, when in a second position, between the first pump and the low first suction point. By default, the first valve is in the first position. This first valve is operated to occupy the second position as a result of a drop in the pressure of the lubrication liquid in the second lubrication circuit, this drop of pressure being detected by the second pressure sensor.

In a second variant of the first embodiment, the first lubrication circuit has two first suction points and a three-position first valve putting the first pump into communication with one or the other of the first suction points so as to enable the lubrication liquid to flow through the first lubrication circuit, or else interrupting this flow of the lubrication liquid through the first lubrication circuit. As in the first variant, the high first suction point is situated at the level of the limit depth and a low first suction point is situated in a low position, below the limit depth and also below the second suction point.

This first valve makes it possible either, when in a first position, to enable the lubrication liquid to flow between the first pump and the high first suction point and then through the first lubrication circuit, or else, when in a closed second position, to prevent any flow of the lubrication liquid through the first lubrication circuit, or else, when in a third position, to cause the lubrication liquid to flow between the first pump and the low first suction point and then through the first lubrication circuit. By default, this first valve is in the first position. This first valve is operated to occupy the closed second position as a result of the level of the lubrication liquid in the tank dropping to below the limit depth as detected by the detector means. This first valve may be operated to occupy its third position as a result of the pressure of the lubrication liquid dropping in the second lubrication circuit as detected by the second pressure sensor.

Furthermore, the drop in the level of the lubrication liquid in the tank to below the limit depth is detected by means of the first pressure sensor forming part of the detector means. Thereafter, this first valve may be operated to occupy its closed second position by the first pressure sensor. This second variant of the dual circuit lubrication device of the invention advantageously enables the flow of the lubrication liquid through the first lubrication circuit to be stopped as soon as a drop in the pressure of the lubrication liquid in the first lubrication circuit is detected by the first pressure sensor.

As mentioned above, this drop of the pressure of the lubrication liquid in the first lubrication circuit may follow on from a drop in the level of the lubrication liquid in the tank to below the limit depth.

This drop of the pressure of the lubrication liquid in the first lubrication circuit may also be generated by a major leak in the first lubrication circuit, e.g. as a result of a clear break in a first pipe or in the first heat exchanger. Advantageously, this second variant thus makes it possible to stop the lubrication liquid flowing in the first lubrication circuit without waiting for the level of the lubrication liquid in the tank to drop to below the limit depth, thus making it possible to conserve a greater quantity of lubrication liquid in the tank.

In a third variant of the first embodiment of the invention, the first lubrication circuit has a single first suction point that is vertically movable inside the tank. This first suction point is movable inside the tank between the limit depth at a low position situated at the bottom of the tank, i.e. below the limit depth.

This first suction point is located by default at the level of the limit depth in order to make it possible to detect the level of the lubrication liquid in the tank dropping to below the limit depth. Thereafter, if it is found that the leak detected by the detector means is located in the second lubrication circuit, the first suction point is moved inside the tank to a low position so as to enable the first lubrication circuit to be fed with lubrication liquid. This low position is situated below the second suction point, and preferably at the bottom of the tank.

This third variant advantageously makes it possible to use only one first suction point and to omit a first valve. Furthermore, since the position of the first suction point is movable, the limit depth may be adapted as a function of the quantity of lubrication liquid actually present in the tank.

In a second embodiment of the dual circuit lubrication device of the invention, the detector means are formed by a liquid presence sensor positioned in the tank at the level of the limit depth. The first lubrication circuit then has a single first suction point situated in a low position, below the limit depth and also below the second suction point. This first suction point is preferably situated in the bottom of the tank.

In this second embodiment, the first lubrication circuit may include a two-position first valve enabling the lubrication liquid to flow in the first lubrication circuit or else enabling such flow to be interrupted. This first valve serves either, in a first position, to allow the lubrication liquid to flow between the first pump and the first suction point and then through the first lubrication circuit, or else, in a closed second position, to prevent any flow of the lubrication liquid in the first lubrication circuit. By default, this first valve is in the first position. This first valve is operated to occupy the closed second position as a result of detecting that the level of the lubrication liquid in the tank has dropped below the limit depth.

Furthermore, a fourth variant is applicable to both embodiments of the dual circuit lubrication device of the invention. In this fourth variant, the second lubrication circuit has a two-position second valve enabling the lubrication liquid to flow between the second pump and the second suction point and then through the second lubrication circuit, or else interrupting said flow of the lubrication liquid through the second lubrication circuit.

This second valve when in an open position thus enables the second lubrication circuit to be fed with the lubrication liquid, and when in a closed position it enables the flow of the lubrication liquid in the second lubrication circuit to be stopped. By default, this second valve is in the open position. This second valve is operated to occupy the closed position as a result of a drop of the pressure of the lubrication liquid in the second lubrication circuit, this pressure drop being detected by the second pressure sensor.

Furthermore, this drop of the pressure of the lubrication liquid in the second lubrication circuit may follow on from the level of the lubrication liquid in the tank dropping to below the position of the second suction point. This drop of the pressure of the lubrication liquid in the second lubrication circuit may also be generated by a major leak in the second lubrication circuit, e.g. as a result of a clear break in a second pipe or in the second heat exchanger.

Advantageously, this fourth variant thus enables the feed to the second lubrication circuit to be interrupted without waiting for the level of the lubrication liquid in the tank to drop to below the position of the second suction point, thus enabling a greater quantity of lubrication liquid to be conserved in the tank.

This dual circuit lubrication device thus makes it possible to propose an overall system of increased reliability for lubricating a mechanical system, the lubrication device being made up solely of two lubrication subsystems that are complete and independent, with the exception of a lubrication liquid tank that is common to both of them.

Furthermore, the lubrication device avoids a complete failure of the lubrication of the mechanical system as a result of the lubrication liquid running out from the tank, e.g. in the event of a slow leak from a lubrication circuit, where such a slow leak cannot be detected by pressure sensors.

There is thus no limit on the duration of lubrication after a leak has been detected on a lubrication circuit, while nevertheless ensuring that cooling of the lubrication liquid is provided by at least one lubrication circuit.

In addition, the first and second pumps and the first and second valves may be situated inside the mechanical system, e.g. above the tank. Advantageously, following a leak from a pump or a valve, the lubrication liquid returns into the tank, thereby avoiding part of the lubrication liquid being lost from the tank.

The present invention also provides a main power transmission gearbox for a rotary wing aircraft. This main power transmission gearbox is provided with a dual circuit lubrication device as described above. The tank of the dual circuit lubrication device is constituted by a casing of the main power transmission gearbox.

Advantageously, no emergency lubrication system is installed on the main power transmission gearbox, where such an emergency system is used very occasionally and only in the event of a failure of the main system and therefore presents weight that is penalizing.

BRIEF DESCRIPTION OF THE SEVERAL VIEWS OF THE DRAWINGS

The invention and its advantages appear in greater detail from the context of the following description of examples given by way of illustration with reference to the accompanying figures, in which.

DETAILED DESCRIPTION OF THE INVENTION

Elements that are present in more than one of the figures are given the same references in each of them.

The purpose of dual circuit lubrication devices 1 as shown in FIGS. 1 to 4 is to lubricate a mechanical system 3 including in particular rotary elements 5, such as shafts and bearings, together with elements for transmitting power and for reducing or increasing speed, such as gearing. By way of example, the mechanical system 3 may be a main power transmission gearbox of a rotary wing aircraft.

Each dual circuit lubrication 1 has a tank 2 and two lubrication circuits 10, 20 serving simultaneously to lubricate the mechanical system 3. The tank 2 is formed by a casing of the mechanical system 3 and it contains a lubrication liquid such as oil. Each lubrication circuit 10, 20 includes a pump 11, 21, a pressure sensor 12, 22, a heat exchanger 13, 23, a filter 15, 25, spray nozzles 14, 24, at least one suction point 16, 17, 27, and pipes respectively connecting together the components in each lubrication circuit 10, 20. The second lubrication circuit 20 has a single second suction point 27, where the first lubrication circuit 10 may have one or else two first suction points 16, 17. The suction points 16, 17, 27 are situated inside the tank 2, with the second suction point 27 being positioned in an intermediate position B in the tank 2.

Each pump 11, 21 serves to draw lubrication liquid from the tank 2 via a suction point 16, 17, 27 and to deliver the lubrication liquid into the corresponding lubrication circuit 10, 20. Each heat exchanger 13, 23 serves to cool the lubrication liquid before it reaches the nozzles 14, 24 after passing through the filters 15, 25. The nozzles 14, 24 are specific and distinct for each lubrication circuit 10, 20, however they could nevertheless coincide and be common to both lubrication circuits 10, 20.

Figure 1:
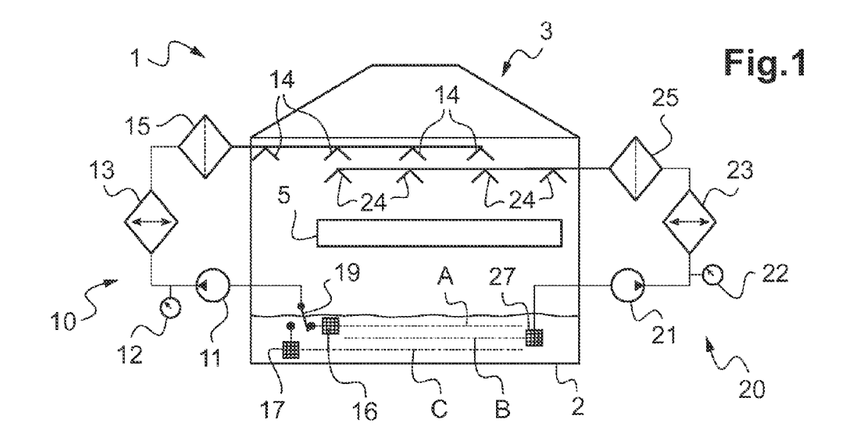
FIGS. 1 to 3 show variants of a first embodiment of the dual circuit lubrication device.

In a first variant of a first embodiment of the dual circuit lubrication device 1 as shown in FIG. 1, the first lubrication circuit 10 has two first suction points 16, 17 and a two-position first valve 19. This first valve 19 serves to connect the first pump 11 to one or the other of the two first suction points 16, 17 in order to deliver the lubrication liquid into the first lubrication circuit 10. A high first suction point 16 and a low first suction point 17 are situated respectively in a high position A and in a low position C inside the tank 2. The low position C is at the bottom of the tank 2 and the intermediate position B is situated between the high position A and the low position C.

Figure 2:
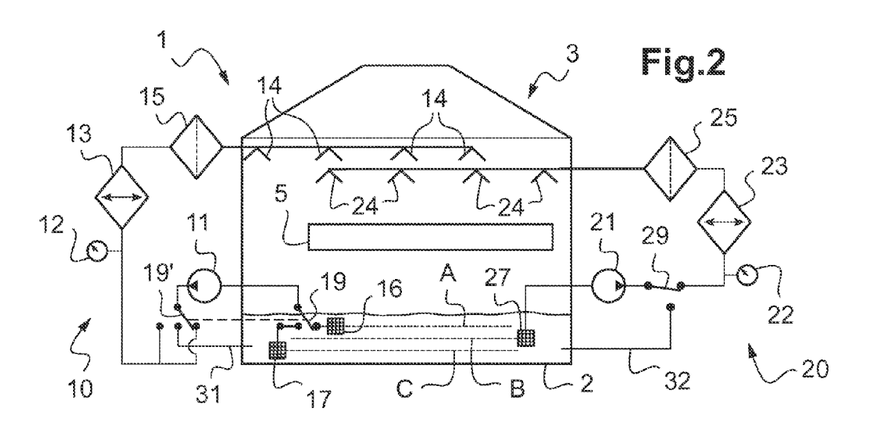

A second variant of the first embodiment of the dual circuit lubrication device 1, as shown in FIG. 2, differs from the first variant in two respects. The two-position first valve 19 is replaced by a three-position first valve 19 serving to connect the first pump 11 with one or the other of the first suction points 16, 17 so that lubrication liquid flows into the first lubrication circuit 10, or else interrupting this flow of lubrication liquid into the first lubrication circuit 10. This first valve 19 controls both the suction and the delivery of the first pump 11, a first secondary valve 19' connected to the first valve 19 being on the delivery side of the first pump 11. This first valve 19 thus serves either, when in a first position, to deliver the lubrication liquid into the first lubrication circuit 10 via the high first suction point 16, or, when in a closed second position, to prevent any flow of lubrication liquid into the first lubrication circuit 10, or else, when in a third position, to deliver the lubrication liquid into the first lubrication circuit 10 via the low first suction point 17.

In the secondary first valve 19', the first and third positions put the delivery from the first pump 11 into communication with the first lubrication circuit 10, thus enabling the lubrication liquid leaving the first pump 11 to reach the first nozzle 14. In contrast, in the second position, the secondary first valve 19' puts the delivery from the first pump 11 into communication with a first return pipe 31, enabling the lubrication liquid leaving the first pump 11 to return to the tank 2. Furthermore, the second and third positions of the first valve 19 proper are connected to the low first suction point 17, whereas the first position is connected to the high first suction point 16.

These first and third positions of the first valve 19 in this second variant correspond likewise to the two positions of the first valve 19 in the first variant. By default, the first valve 19 is in the first position in both the first and second variants.

Furthermore, the second lubrication circuit 20 has a two-position second valve 29 serving to connect the second pump 21 to the second suction point 27 so that the lubrication liquid flows into the second lubrication circuit 20 or else so that this flow of lubrication liquid into the second lubrication circuit 20 is cut off. By default, the second valve 29 is in an open position connecting the delivery from the second pump 21 to the second lubrication circuit 20, thus enabling the lubrication liquid leaving the second pump 21 to reach the second nozzles 24. A closed position of this second valve 29 connects the delivery from the second pump 21 to a second return pipe 32, enabling the lubrication liquid leaving the second pump 21 to return to the tank 2.

Figure 3:
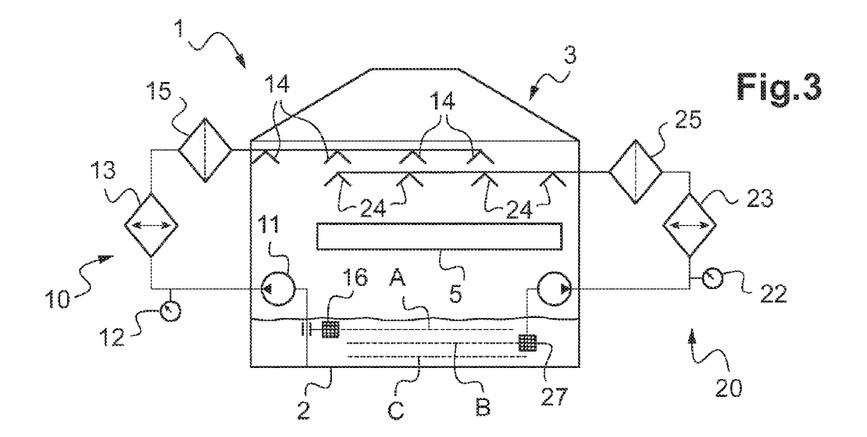

A third variant of the first embodiment of the dual circuit lubrication device 1 is shown in FIG. 3. This third variant differs from the first variant by the presence of a single first suction point 16 and the absence of a first valve 19. This first suction point 16 is movable inside the tank 2 between the high position A and the low position C.

In addition, the first and second pumps 11, 21 are situated inside the mechanical system 3 and above the tank 2. As a result, if there is a leak from a pump 11, 21, the lubrication liquid returns into the tank 2, thus avoiding discharging some of the lubrication liquid from the tank 2.

Figure 4:
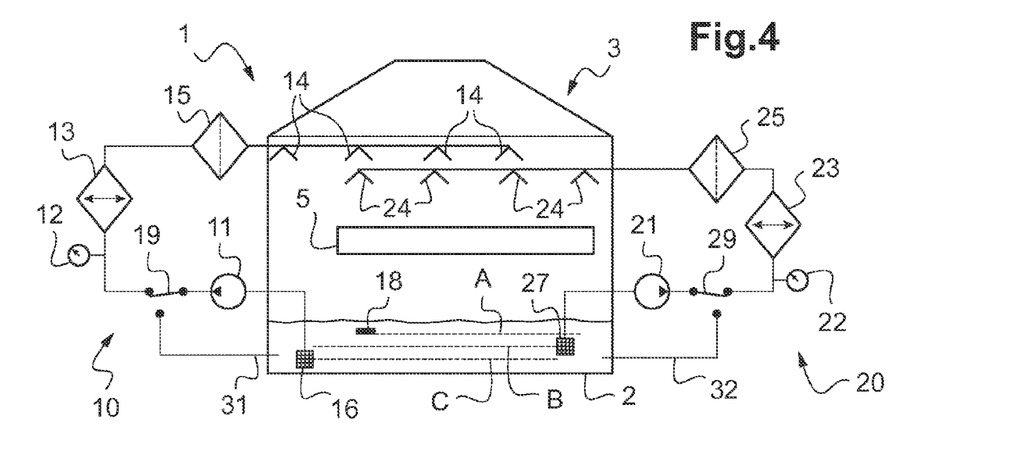
FIG. 4 shows a second embodiment of the dual circuit lubrication device.

In a second embodiment of the dual circuit lubrication device, as shown in FIG. 4, the first lubrication circuit 10 has a single first suction point 16, a liquid presence sensor 18, and a two-position first valve 19. This first valve 19 serves to connect the first pump 11 to the first suction point 16 so that the lubrication liquid flows into the first lubrication circuit 10 or else to interrupt this flow of lubrication liquid into the first lubrication circuit 10. The open position of this first valve 19 puts the delivery from the first pump 11 into communication with the first lubrication circuit 10, thereby enabling the lubrication liquid leaving the first pump 11 to reach the first nozzle 14. The closed position of this first valve 19 puts the delivery from the first pump 11 into communication with a first return pipe 31 enabling the lubrication liquid leaving the first pump 11 to return to the tank 2. The first suction point 16 is positioned in the tank 2 in the low position C. The liquid presence sensor 18 is situated in the tank 2 at the high position A.

In addition, the second lubrication circuit 20 has a two-position second valve 29, this second valve 29 being identical to the valve in the second variant of the first embodiment of the dual circuit lubrication device 1.

Figure 5:
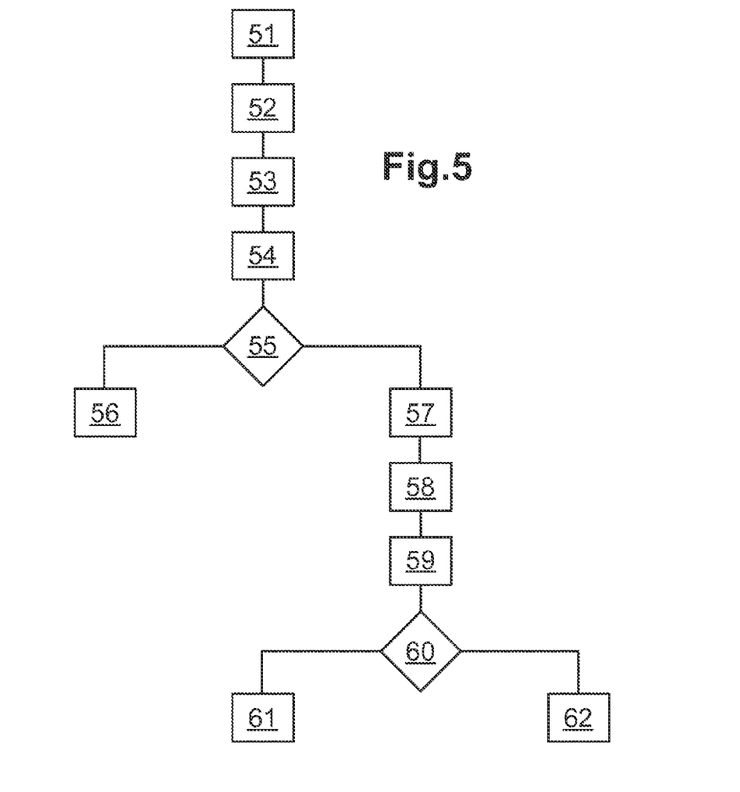
FIG. 5 is a diagram summarizing a dual circuit lubrication method.

The dual circuit lubrication devices 1 shown in FIGS. 1 to 4 are capable of performing the lubrication method of the invention as summarized in the diagram shown in FIG. 5. The lubrication method comprises a plurality of steps.

During a first step 51, the lubrication liquid is used to lubrify the mechanical system 3 simultaneously via the first lubrication circuit 10 and via the second lubrication circuit 20. The lubrication liquid is drawn by the first and second pumps 11, 21 from the tank 2 and is distributed respectively to the first and second lubrication circuits 10, 20. The nozzles 14, 24 can then spray this lubrication liquid onto the mechanical system 3.

During a second step 52, the level of the lubrication liquid in the tank 2 dropping below a limit depth is detected by detector means for detecting that the level of the lubrication liquid in the tank 2 has passed under this limit depth.

In the first embodiment of the dual circuit lubrication device 1, the detector means are formed by the high first suction point 16 and the first pressure sensor 12. In the third variant, the movable first suction point 16 should then be located in the high position A.

In the second embodiment of the dual circuit lubrication device 1, the detector means are formed by the liquid presence sensor 18.

The high position A corresponds to the limit depth in the tank 2 and the detector means serve to determine that the level of the lubrication liquid has dropped below this limit depth. This drop in the level of the lubrication liquid in the tank 2 to below a limit depth means that the tank 2 is becoming progressively emptied of the lubrication liquid, and consequently that a leak has occurred in one of the lubrication circuits 10, 20.

In the first embodiment of the dual circuit lubrication device 1, as a result of this level of the lubrication liquid in the tank 2 dropping below the limit depth, the high first suction point 16 that is situated in the high position A is to be found above the level of the lubrication liquid. As a result, the first pump 11 can no longer deliver the lubrication liquid into the first lubrication circuit 10. The pressure of the lubrication liquid thus drops in this first lubrication circuit 10, with this pressure drop being detected by the first pressure sensor 12.

In the second embodiment of the dual circuit lubrication device 1, this drop in the level of the lubrication liquid in the tank 2 to below the limit depth is detected directly by the liquid presence sensor 18.

During a third step 53, the flow of lubrication liquid in the first lubrication circuit 10 is stopped in order to test the operation of the second lubrication circuit 20. The detector means serve to determine the presence of a leak in one of the lubrication circuits 10, 20 without identifying the particular lubrication circuit 10, 20 that actually has the leak. Consequently, by stopping the flow of lubrication liquid in the first lubrication circuit 10, lubrication liquid flows only in the second lubrication circuit 20.

Since the lubrication liquid is below the limit depth in the tank 2, the first pump 11 can no longer feed the first lubrication circuit 10 in the first embodiment of the dual circuit lubrication device 1. Consequently, the flow of lubrication liquid in this first lubrication circuit 10 is stopped.

However, in the second embodiment of the dual circuit lubrication device 1, the sole first suction point 16 is in the low position C, i.e. below the limit depth. It is therefore appropriate to stop the lubrication liquid flowing into the first lubrication circuit 10, either directly by stopping the first pump 11, or else by using the first valve 19. This first valve 19 must then be put into the closed position in order to interrupt the flow of the lubrication liquid in the first lubrication circuit 10. The first valve 19 is put into the closed position as a result of detecting that the level of the lubrication liquid in the tank 2 has dropped below the limit depth, and this is performed automatically. Nevertheless, it is also possible for the first valve 19 to be put into this closed position manually by an operator as a result of a visible or audible alarm being issued following detection of the level of the lubrication liquid dropping below the limit depth.

The first pump 11 can be stopped by switching off its electrical power supply if the first pump 11 is an electric pump. The first pump can also be stopped by using clutch means when the first pump 11 is a mechanical pump driven by a transmission unit which may be the mechanical system 3.

It is also possible in a specific first stopping mode for the first embodiment of the dual circuit lubrication device 1 to stop the flow of the lubrication liquid in the first lubrication circuit 10 by directly stopping the first pump 11. In a second specific stopping mode that is suitable solely for the second variant of this first embodiment, it is also possible to put the first valve 19 into its closed second position. These specific stopping modes serve to avoid the flow of the lubrication liquid into the first lubrication circuit 10 being reestablished and stopped in untimely manner, e.g. as a result of the lubrication liquid sloshing in the tank 2, e.g. as a result of changes in the attitude of an aircraft fitted with the mechanical system 3.

During a fourth step 54, the pressure of the lubrication liquid in the second lubrication circuit 20 is measured by the second pressure sensor 22.

During a fifth step 55, the presence or absence of a drop in the pressure of the lubrication liquid in the second lubrication circuit 20 is detected. The pressure of the lubrication liquid in the second lubrication circuit 20 may drop either as a result of a major leak directly from the second lubrication circuit 20, or else as a result of the level of the lubrication liquid in the tank 2 dropping below the second suction point 27.

If no drop is detected in the pressure of the lubrication liquid in the second lubrication circuit 20, then the method switches to a sixth step 56. It can then be concluded that the failure of the lubrication device stems probably from the first lubrication circuit 10 which must have a leak. This sixth step 56 thus brings the method to an end, and it is then possible to issue a first alarm in the form of a first luminous and/or audible signal to inform an operator that the first lubrication circuit 10 probably includes a leak.

If a drop in the pressure of the lubrication liquid in the second lubrication circuit 20 is detected, then the method continues with additional steps. This drop of pressure in the lubrication liquid in the second lubrication circuit 20 probably confirms the presence of a leak in the second lubrication circuit 20.

During a seventh step 57, the flow of lubrication liquid is reestablished in the first lubrication circuit 10 in order to enable the mechanical system 3 to be lubricated.

In the first and second variants that have two first suction points 16, 17, the first valve 19 needs to be switched to the third position enabling the first pump 11 to be connected to the low first suction point 17. This placing of the first valve 19 in the third position is controlled by detecting the drop in the pressure of the lubrication liquid in the second lubrication circuit 20.

For the third variant, the movable first suction point 16 needs to be lowered to below the level of the lubrication liquid in order to enable the first pump to draw the lubrication liquid from the tank 2 and thus feed the first lubrication circuit 10. This movable first suction point 16 needs to be lowered at least to below the intermediate position B, and preferably to the low position C.

Furthermore, in these three variants, if the first pump 11 has been stopped during the third step 53, it is necessary to put this first pump 11 back into operation.

During an eighth step 58, the flow of the lubrication liquid in the second lubrication circuit 20 is stopped. Since the lubrication liquid is below the second suction point 27 in the tank 2, the second pump 21 can no longer feed the second lubrication circuit 20. Consequently, the flow of lubrication liquid is stopped in the second lubrication circuit 20.

In contrast, it is also possible in the first specific mode of stopping to stop the flow of the lubrication liquid in the second lubrication circuit 20 by directly stopping the second pump 21. It is also possible in the second specific mode of stopping to put the second valve 19 into the closed position so as to interrupt the flow of the lubrication liquid in the second lubrication circuit 20. The second valve 29 is put into its closed position as a result of detecting the drop in the pressure of the lubrication liquid in the second lubrication circuit 20.

The seventh and eighth steps may be performed sequentially or else simultaneously. Nevertheless, the seventh step is preferably performed before the eighth step in order to minimize the duration during which the mechanical system 3 is not being lubricated.

During a ninth step 59, the pressure of the lubrication liquid in the first lubrication circuit 10 is measured by using the first pressure sensor 12 in order to verify that a leak is not also present in the first lubrication circuit 10.

During a tenth step 60, the presence or absence of a drop of pressure in the lubrication liquid in the first lubrication circuit 10 is detected. The pressure of the lubrication liquid in the first lubrication circuit 10 can drop either as a result of a major leak directly from the first lubrication circuit 10, or else as a result of the level of the lubrication liquid in the tank 2 dropping below the low first suction point 17.

If no drop is detected in the pressure of the lubrication liquid in the first lubrication circuit 10, then the method switches to an eleventh step 61. It can then be concluded that the failure of the lubrication device does indeed stem from the second lubrication circuit 20 which must contain a leak. This eleventh step 61 then brings the method to an end, with it being possible for a second alarm to be issued in the form of a second luminous and/or audible signal informing an operator that the second lubrication circuit 20 probably includes a leak.

If a drop is detected in the pressure of the lubrication liquid in the first lubrication circuit 10, then the method switches to a twelfth step 62. This drop of the pressure of the lubrication liquid in the first lubrication circuit 10 reveals the presence of a leak also in the first lubrication circuit 10, or more probably that the leak is directly from the tank 2. This twelfth step 62 also brings the method to the end, with it then being possible to issue a third alarm in the form of a third luminous and/or audible signal informing an operator that the entire dual circuit lubrication device 1 has failed.

Under such circumstances, the lubrication circuits 10 and 20 do not provide the mechanical system 3 with any lubrication.

This dual circuit lubrication device 1 thus makes it possible to propose a lubrication system for a mechanical system 3 that presents increased reliability, without using an emergency circuit, and without using a plurality of lubrication liquid tanks. In addition, this dual circuit lubrication device 1 makes it possible to ensure that the lubrication liquid is cooled continuously and that there is no limit on the duration of lubrication once a leak has been detected.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. A dual circuit method of lubricating a mechanical system that includes a tank containing a lubrication liquid, the method comprising:
   using the lubrication liquid to lubricate the mechanical system simultaneously via a first lubrication circuit and a second lubrication circuit, the second lubrication circuit having a second suction point situated below a limit depth in the tank, the first lubrication circuit including at least one first suction point that can be situated below the second suction point;
   detecting a drop in the level of the lubrication liquid in the tank to below the limit depth;
   stopping the flow of the lubrication liquid in the first lubrication circuit;
   measuring the pressure of the lubrication liquid in the second lubrication circuit;
   detecting a drop of the pressure of the lubrication liquid in the second lubrication circuit;
   reestablishing the flow of the lubrication liquid in the first lubrication circuit; and
   stopping the flow of the lubrication liquid in the second lubrication circuit.

2. A lubrication method according to claim 1, wherein the first lubrication circuit includes a first valve, the first valve is operated as a result of the drop of the level of the lubrication liquid in the tank below the limit depth, and the flow of the lubrication liquid in the first lubrication circuit is stopped by means of the first valve.

3. A lubrication method according to claim 1, wherein the first lubrication circuit includes a first valve, the first valve is operated on detecting a drop in the pressure of the lubrication liquid in the second lubrication circuit, and the flow of the lubrication liquid in the first lubrication circuit is reestablished by means of the first valve.

4. A lubrication method according to claim 1, wherein the first lubrication circuit includes a first pump, the flow of the lubrication liquid in the first lubrication circuit is stopped by stopping the pump, and the flow of the lubrication liquid in the first lubrication circuit is reestablished by restarting the first pump.

5. A lubrication method according to claim 1, wherein the second lubrication circuit includes a second pump and the flow of the lubrication liquid in the second lubrication circuit is stopped by stopping the second pump.

6. A lubrication method according to claim 1, wherein the second lubrication circuit includes a second valve, the second valve is operated on detecting a drop in the pressure of the lubrication liquid in the second lubrication circuit, and the flow of the lubrication liquid in the second lubrication circuit is stopped by means of the valve.

7. A lubrication method according to claim 1, wherein the drop in the level of the lubrication liquid to below the limit depth in the tank is detected by detecting a drop of the pressure of the lubrication liquid in the first lubrication circuit.

8. A lubrication method according to claim 1, wherein the drop of the level of the lubrication liquid to below the limit depth in the tank is detected by means of a liquid presence sensor situated in the tank at the level of the limit depth.

9. A lubrication method according to claim 1, wherein after detecting the drop of the pressure of the lubrication liquid in the second lubrication circuit, the lubrication liquid is delivered into the first lubrication circuit via a first suction point situated in the tank below the limit depth.

10. A lubrication method according to claim 1, wherein, after reestablishing the flow of the lubrication liquid in the first lubrication circuit, the pressure of the lubrication liquid in the first lubrication circuit is measured.

11. A dual circuit lubrication device for lubricating a mechanical system, the lubrication device having a tank and two lubrication circuits, the tank containing a lubrication liquid, a first lubrication circuit comprising a first pump, first pipes, a first pressure sensor, first nozzles, and at least one first suction point for sucking the lubrication liquid, each first suction point being situated in the tank, a second lubrication circuit comprising a second pump, second pipes, a second pressure sensor, second nozzles, and a second suction point for sucking the lubrication liquid, the second suction point being situated in the tank, each pump acting via the first and second suction points to deliver the lubrication liquid respectively into the first and second pipes, and then into the first and second nozzles in order to lubricate the mechanical system, wherein the dual circuit lubrication device includes detector means for detecting the lubrication liquid passing below the limit depth in the tank, the second suction point being situated below the limit depth, the lubrication device implementing the lubrication method according to claim 1.

12. A lubrication device according to claim 11, wherein the first lubrication circuit has two first suction points and a first valve connecting the first pump to the two first suction points, the detector means being formed by a high first suction point and the first pressure sensor, the high first suction point being situated at the level of the limit depth, and a low first suction point being situated at a low position situated below the second suction point.

13. A lubrication device according to claim 12, wherein the first valve is a two-position valve putting the first pump into communication with one or the other of the first suction points, the first valve being operated by the second pressure sensor.

14. A lubrication device according to claim 12, wherein the first valve is a three-position valve enabling the lubrication liquid to flow between the first pump and one or the other of the first suction points in order to enable the lubrication liquid to flow in the first lubrication circuit, or else interrupting the flow of the lubrication liquid in the first lubrication circuit, the first valve being operated by the first pressure sensor and the second pressure sensor.

15. A lubrication device according to claim 11, wherein the first lubrication circuit includes a single first suction point that is movable, the detector means being formed by the first suction point and the first pressure sensor, the first suction point being movable in the tank between the limit depth and a low position situated below the second suction point.

16. A lubrication device according to claim 11, wherein the first lubrication circuit includes a single first suction point and a liquid presence sensor, the detector means being formed by the liquid presence sensor positioned in the tank at the level of the limit depth, the first suction point being situated at the level of a low position below the second suction point.

17. A lubrication device according to claim 16, wherein the first lubrication circuit includes a two-position first valve enabling the lubrication liquid to flow between the first pump and the first suction point and then in the first lubrication circuit, or else interrupting the flow of the lubrication liquid in the first lubrication circuit, the first valve being operated by the liquid presence sensor.

18. A lubrication device according to claim 11, wherein the second lubrication circuit includes a two-position second valve enabling the lubrication liquid to flow between the second pump and the second suction point and then into the second lubrication circuit or else interrupting the flow of the lubrication liquid in the second lubrication circuit, the second valve being operated by the second pressure sensor.

19. A lubrication device according to claim 11, wherein the mechanical system is a main power transmission gearbox of a rotary wing aircraft.

20. A main power transmission gearbox for a rotary wing aircraft, wherein the main power transmission gearbox is provided with a lubrication device according to claim 19, the tank being constituted by a casing of the main power transmission gearbox.

* * * * *